(12) United States Patent
Rothschild (10) Patent No.: US 8,909,729 B2
(45) Date of Patent: Dec. 9, 2014

(54) SYSTEM AND METHOD FOR SHARING DIGITAL MEDIA CONTENT

(75) Inventor: Leigh M. Rothschild, Sunny Isles Beach, FL (US)

(73) Assignee: Portulim Foundation LLC, Wilmington, DE (US)

( * ) Notice: Subject to any disclaimer, the term of this patent is extended or adjusted under 35 U.S.C. 154(b) by 631 days.

(21) Appl. No.: 11/716,763

(22) Filed: Mar. 12, 2007

(65) Prior Publication Data

US 2007/0168463 A1  Jul. 19, 2007

Related U.S. Application Data (63) Continuation-in-part of application No. 09/997,477, filed on Nov. 20, 2001, now Pat. No. 7,711,774, and a continuation-in-part of application No. 10/034,832, filed on Dec. 28, 2001, now Pat. No. 7,503,059, and a continuation-in-part of application No. 11/400,889, filed on Apr. 10, 2006.

(51) Int. Cl.
| | | |
|---|---|---|
| G06F 15/16 | (2006.01) | |
| H04L 29/08 | (2006.01) | |
| G06Q 10/10 | (2012.01) | |

(52) U.S. Cl.
CPC .............. *H04L 67/06* (2013.01); *H04L 67/306* (2013.01); *G06Q 10/10* (2013.01)
USPC ............ 709/217; 709/203; 709/206; 709/231

(58) Field of Classification Search
USPC ........................................................ 709/219
See application file for complete search history.

(56) References Cited

U.S. PATENT DOCUMENTS

| | | | |
|---|---|---|---|
| 4,641,253 | A | 2/1987 | Mastran |
| 4,785,472 | A | 11/1988 | Shapiro |
| 5,087,980 | A | 2/1992 | Staffer |
| 5,119,474 | A | 6/1992 | Beitel et al. |
| 5,274,758 | A | 12/1993 | Beitel et al. |

(Continued)

FOREIGN PATENT DOCUMENTS

| | | |
|---|---|---|
| WO | WO-99/26415 | 5/1999 |
| WO | WO-02/15024 | 2/2002 |

OTHER PUBLICATIONS

Final Office Action issued in U.S. Appl. No. 11/527,279 and mailed Jun. 21, 2010.

(Continued)

*Primary Examiner* — Hamza Algibhah
*Assistant Examiner* — Natisha Cox (57) ABSTRACT

A system and method for sharing digital content are provided. A system and method of the present disclosure enable a user to automatically list their media content and also enable automatic placement of the content onto a community web site that the user is participating in. The system and method provide for reading at least one identifier of at least one media content; determining at least one pre-selected community web site from a database and an identity of a first user of the at least one media content; transmitting the at least one identifier and the identity to the at least one pre-selected community web site; and posting the at least one identifier on a first predetermined page of the at least one community web site, the first predetermined page being associated with the identity of the first user.

18 Claims, 5 Drawing Sheets

(56) References Cited

U.S. PATENT DOCUMENTS

| | | | |
|---|---|---|---|
| 5,365,579 A | 11/1994 | Hendrickson | |
| 5,394,548 A | 2/1995 | Nakajima et al. | |
| 5,404,437 A | 4/1995 | Nguyen | |
| 5,430,835 A | 7/1995 | Williams et al. | |
| 5,440,677 A | 8/1995 | Case et al. | |
| 5,467,288 A | 11/1995 | Fasciano et al. | |
| 5,479,268 A | 12/1995 | Young et al. | |
| 5,553,221 A | 9/1996 | Reimer et al. | |
| 5,559,949 A | 9/1996 | Reimer et al. | |
| 5,583,980 A | 12/1996 | Anderson | |
| 5,596,705 A | 1/1997 | Reimer et al. | |
| 5,624,265 A | 4/1997 | Redford et al. | |
| 5,640,560 A | 6/1997 | Smith | |
| 5,642,477 A | 6/1997 | de Carmo et al. | |
| 5,675,511 A | 10/1997 | Prasad et al. | |
| 5,696,905 A | 12/1997 | Reimer et al. | |
| 5,715,400 A | 2/1998 | Reimer et al. | |
| 5,758,093 A | 5/1998 | Boezeman et al. | |
| 5,781,730 A | 7/1998 | Reimer et al. | |
| 5,808,662 A | 9/1998 | Kinney et al. | |
| 5,861,881 A | 1/1999 | Freeman et al. | |
| 5,898,429 A | 4/1999 | Trom et al. | |
| 5,973,679 A | 10/1999 | Abbott et al. | |
| 5,987,525 A | 11/1999 | Roberts et al. | |
| 6,006,241 A | 12/1999 | Purnaveja et al. | |
| 6,065,042 A | 5/2000 | Reimer et al. | |
| 6,094,671 A | 7/2000 | Chase et al. | |
| 6,118,445 A | 9/2000 | Nonomura et al. | |
| 6,122,658 A | 9/2000 | Chaddha | |
| 6,173,317 B1 | 1/2001 | Chaddha et al. | |
| 6,226,655 B1 | 5/2001 | Borman et al. | |
| 6,230,172 B1 | 5/2001 | Purnaveja et al. | |
| 6,230,207 B1 | 5/2001 | Roberts et al. | |
| 6,239,801 B1 | 5/2001 | Chiu et al. | |
| 6,240,459 B1 | 5/2001 | Roberts et al. | |
| 6,240,555 B1 | 5/2001 | Shoff et al. | |
| 6,337,947 B1 | 1/2002 | Porter et al. | |
| 6,438,751 B1 | 8/2002 | Voyticky et al. | |
| 6,490,580 B1 | 12/2002 | Dey et al. | |
| 6,519,771 B1 | 2/2003 | Zenith | |
| 6,529,949 B1 * | 3/2003 | Getsin et al. | 709/217 |
| 6,571,392 B1 | 5/2003 | Zigmond et al. | |
| 6,580,870 B1 | 6/2003 | Kanazawa et al. | |
| 6,678,866 B1 | 1/2004 | Sugimoto et al. | |
| 6,757,482 B1 | 6/2004 | Ochiai et al. | |
| 6,857,130 B2 | 2/2005 | Srikantan et al. | |
| 6,941,383 B1 | 9/2005 | Getsin et al. | |
| 6,944,621 B1 | 9/2005 | Collart | |
| 6,976,265 B1 | 12/2005 | Yang et al. | |
| 7,058,889 B2 | 6/2006 | Trovato et al. | |
| 7,103,908 B2 | 9/2006 | Tomsen | |
| 7,120,924 B1 | 10/2006 | Katcher et al. | |
| 7,136,571 B1 | 11/2006 | Dagtas | |
| 7,143,428 B1 | 11/2006 | Bruck et al. | |
| 7,219,173 B2 | 5/2007 | Sha et al. | |
| 7,254,779 B1 | 8/2007 | Rezvani et al. | |
| 7,428,504 B2 | 9/2008 | Song | |
| 7,434,154 B2 | 10/2008 | Konetski | |
| 7,464,172 B2 | 12/2008 | Deshpande | |
| 7,702,536 B1 | 4/2010 | Alabraba et al. | |
| 8,046,813 B2 | 10/2011 | Rothschild | |
| 2001/0001865 A1* | 5/2001 | Barraclough et al. | 709/206 |
| 2001/0005446 A1 | 6/2001 | Uchikoga | |
| 2001/0013068 A1 | 8/2001 | Klemets et al. | |
| 2001/0044726 A1 | 11/2001 | Li et al. | |
| 2002/0016820 A1 | 2/2002 | Du Val et al. | |
| 2002/0046083 A1 | 4/2002 | Ondeck | |
| 2002/0053083 A1 | 5/2002 | Massey | |
| 2002/0053089 A1 | 5/2002 | Massey | |
| 2002/0059342 A1 | 5/2002 | Gupta et al. | |
| 2002/0077988 A1* | 6/2002 | Sasaki et al. | 705/59 |
| 2002/0078144 A1 | 6/2002 | Lamkin et al. | |
| 2002/0078456 A1 | 6/2002 | Hudson et al. | |
| 2002/0087569 A1 | 7/2002 | Fischer et al. | |
| 2002/0089519 A1 | 7/2002 | Betz et al. | |
| 2002/0090201 A1 | 7/2002 | Betz et al. | |
| 2002/0091658 A1 | 7/2002 | Bae | |
| 2002/0091762 A1 | 7/2002 | Sohn et al. | |
| 2002/0106188 A1 | 8/2002 | Crop et al. | |
| 2002/0106191 A1 | 8/2002 | Betz et al. | |
| 2002/0116707 A1 | 8/2002 | Morris et al. | |
| 2002/0116708 A1 | 8/2002 | Morris et al. | |
| 2002/0120925 A1 | 8/2002 | Logan | |
| 2002/0131511 A1 | 9/2002 | Zenoni | |
| 2002/0152233 A1 | 10/2002 | Cheong et al. | |
| 2002/0161462 A1 | 10/2002 | Fay et al. | |
| 2002/0161797 A1 | 10/2002 | Gallo et al. | |
| 2002/0163533 A1 | 11/2002 | Trovato et al. | |
| 2002/0173273 A1 | 11/2002 | Spurgat et al. | |
| 2002/0180803 A1 | 12/2002 | Kaplan et al. | |
| 2003/0002849 A1 | 1/2003 | Lord | |
| 2003/0009485 A1 | 1/2003 | Turner | |
| 2003/0018609 A1 | 1/2003 | Phillips et al. | |
| 2003/0026587 A1 | 2/2003 | Ostrover | |
| 2003/0035646 A1 | 2/2003 | Salvatori et al. | |
| 2003/0046189 A1 | 3/2003 | Asayama | |
| 2003/0070181 A1 | 4/2003 | Holm | |
| 2003/0088515 A1 | 5/2003 | Cooper et al. | |
| 2003/0113096 A1 | 6/2003 | Taira et al. | |
| 2003/0115598 A1 | 6/2003 | Pantoja | |
| 2003/0140090 A1* | 7/2003 | Rezvani et al. | 709/203 |
| 2003/0152366 A1 | 8/2003 | Kanazawa et al. | |
| 2003/0177503 A1 | 9/2003 | Sull et al. | |
| 2003/0188255 A1 | 10/2003 | Shimizu et al. | |
| 2003/0191816 A1 | 10/2003 | Landress et al. | |
| 2003/0216922 A1 | 11/2003 | Gonzales et al. | |
| 2003/0217363 A1 | 11/2003 | Brady et al. | |
| 2004/0054542 A1 | 3/2004 | Foote et al. | |
| 2004/0205830 A1 | 10/2004 | Kaneko | |
| 2004/0237084 A1 | 11/2004 | Kurzweil et al. | |
| 2004/0261127 A1 | 12/2004 | Freeman et al. | |
| 2005/0015815 A1 | 1/2005 | Shoff et al. | |
| 2005/0028195 A1 | 2/2005 | Feinleib et al. | |
| 2005/0058435 A1 | 3/2005 | Chung et al. | |
| 2005/0070361 A1 | 3/2005 | Lau et al. | |
| 2005/0086069 A1 | 4/2005 | Watson et al. | |
| 2005/0091679 A1 | 4/2005 | Tanaka et al. | |
| 2005/0107898 A1 | 5/2005 | Gannon et al. | |
| 2005/0108026 A1 | 5/2005 | Brierre et al. | |
| 2005/0117886 A1 | 6/2005 | Kang et al. | |
| 2005/0149759 A1 | 7/2005 | Vishwanath et al. | |
| 2005/0152683 A1 | 7/2005 | Ryu | |
| 2005/0182828 A1 | 8/2005 | Lamkin et al. | |
| 2005/0185929 A1 | 8/2005 | Kang et al. | |
| 2005/0193322 A1 | 9/2005 | Lamkin et al. | |
| 2005/0198574 A1 | 9/2005 | Lamkin et al. | |
| 2005/0235282 A1 | 10/2005 | Anderson | |
| 2005/0251749 A1 | 11/2005 | Lamkin et al. | |
| 2005/0265701 A1 | 12/2005 | Lamkin et al. | |
| 2005/0278435 A1 | 12/2005 | Lamkin et al. | |
| 2005/0278729 A1 | 12/2005 | Lamkin et al. | |
| 2006/0041639 A1 | 2/2006 | Lamkin et al. | |
| 2006/0041640 A1 | 2/2006 | Lamkin et al. | |
| 2006/0053056 A1 | 3/2006 | Alspach-Goss et al. | |
| 2006/0077773 A1 | 4/2006 | Seo et al. | |
| 2006/0143559 A1 | 6/2006 | Spielberg et al. | |
| 2006/0257916 A1* | 11/2006 | Hashmi et al. | 435/6 |
| 2006/0259469 A1 | 11/2006 | Chiu | |
| 2006/0272027 A1 | 11/2006 | Noble | |
| 2006/0277454 A1 | 12/2006 | Chen | |
| 2006/0287916 A1* | 12/2006 | Starr et al. | 705/14 |
| 2007/0067707 A1 | 3/2007 | Travis et al. | |
| 2007/0100969 A1 | 5/2007 | Hu | |
| 2007/0143222 A1 | 6/2007 | Chicks et al. | |
| 2007/0160343 A1 | 7/2007 | Sugimoto et al. | |
| 2007/0168543 A1* | 7/2007 | Krikorian et al. | 709/231 |
| 2007/0180387 A1 | 8/2007 | Gravina et al. | |
| 2007/0198632 A1* | 8/2007 | Peart et al. | 709/203 |
| 2008/0046925 A1 | 2/2008 | Lee et al. | |
| 2008/0046956 A1 | 2/2008 | Kulas | |
| 2008/0270570 A1 | 10/2008 | Reed | |
| 2008/0279535 A1 | 11/2008 | Haque et al. | |
| 2009/0259633 A1 | 10/2009 | Bronstein et al. | |
| 2010/0115575 A1 | 5/2010 | Yu et al. | |

(56) References Cited

U.S. PATENT DOCUMENTS

OTHER PUBLICATIONS

Final Office Action issued in U.S. Appl. No. 11/652,436 and mailed on Oct. 20, 2009.
Non-final Office Action issued in U.S. Appl. No. 11/400,889 and mailed on Jun. 3, 2010.
Non-final Office Action issued in U.S. Appl. No. 11/527,279 and mailed on Oct. 5, 2009.
Non-final Office Action issued in U.S. Appl. No. 11/652,436 and mailed Jun. 17, 2010.
Non-final Office Action issued in U.S. Appl. No. 11/652,436 and mailed on Mar. 6, 2009.
Non-final Office Action issued in U.S. Appl. No. 12/380,701 and mailed on Dec. 1, 2009.
Notice of Allowance issued in U.S. Appl. No. 12/380,701 and mailed on Jun. 16, 2010.
Non-final Office Action issued in U.S. Appl. No. 12/380,701 and mailed on Mar. 18, 2010.
Non-final Office Action issued in U.S. Appl. No. 10/034,832 and mailed on Feb. 22, 2007.
Final Office Action issued in U.S. Appl. No. 10/034,832 and mailed on Jul. 19, 2007.
Advisory Action issued in U.S. Appl. No. 10/034,832 and mailed on Oct. 12, 2007.
Non-final Office Action issued in U.S. Appl. No. 10/034,832 and mailed on Jan. 16, 2008.
Non-final Office Action issued in U.S. Appl. No. 10/034,832 and mailed on Jul. 21, 2008.
Notice of Allowance issued in U.S. Appl. No. 10/034,832 and mailed on Jan. 14, 2009.
Restriction Requirement issued in U.S. Appl. No. 09/997,477 and mailed on Jun. 6, 2007.
Non-final Office Action issued in U.S. Appl. No. 09/997,477 and mailed on Oct. 3, 2007.
Final Office Action issued in U.S. Appl. No. 09/997,477 and mailed on Mar. 27, 2008.
Advisory Action issued in U.S. Appl. No. 09/997,477 and mailed on Jun. 12, 2008.
Non-final Office Action issued in U.S. Appl. No. 09/997,477 and mailed on Sep. 18, 2008.
Final Office Action issued in U.S. Appl. No. 09/997,477 and mailed on Apr. 27, 2009.
Advisory Action issued in U.S. Appl. No. 09/997,477 and mailed on Jul. 6, 2009.
Non-final Office Action issued in U.S. Appl. No. 09/997,477 and mailed on Sep. 29, 2009.
Notice of Allowance issued in U.S. Appl. No. 09/997,477 and mailed on Mar. 10, 2010.
Final Office Action issued in U.S. Appl. No. 11/652,436 and mailed on Oct. 19, 2010.
Final Office Action issued in U.S. Appl. No. 11/400,889 and mailed on Dec. 9, 2010.
Non-final Office Action issued in U.S. Appl. No. 12/771,004 and mailed on Dec. 6, 2010.
Notice of Allowance on U.S. Appl. No. 11/652,436, mailed Oct. 26, 2011.
Final Office Action issued in U.S. Appl. No. 12/771,004 and mailed on May 5, 2011.
Non-final Office Action issued in U.S. Appl. No. 11/400,889 and mailed on May 9, 2011.
Non-final Office Action issued in U.S. Appl. No. 11/652,436 and mailed Apr. 12, 2011.
Non-final Office Action issued in U.S. Appl. No. 12/780,236 and mailed Mar. 30, 2011.
Final Office Action issued in U.S. Appl. No. 11/652,436 and mailed Jul. 13, 2011.
Notice of Allowance issued in U.S. Appl. No. 12/380,701 and mailed Jun. 10, 2011.
Final Office Action issued in U.S. Appl. No. 12/780,236 and mailed Aug. 31, 2011.
Final Office Action issued in U.S. Appl. No. 11/400,889 and mailed on Oct. 19, 2011.
Notice of Allowance on U.S. Appl. No. 11/400,889, mailed Mar. 29, 2013.
Non-Final Office Action on U.S. Appl. No. 11/527,279, mailed Jul. 12, 2012.
Notice of Allowance issued in U.S. Appl. No. 12/771,004 mailed Sep. 14, 2012 (19 pages).
Non-Final Office Action on U.S. Appl. No. 11/400,889, mailed Oct. 3, 2012.
Final Office Action on U.S. Appl. No. 11/527,279, mailed Nov. 27, 2012.
Non-Final Office Action on U.S. Appl. No. 11/527,279, mailed Feb. 13, 2013.
Non-Final Office Action on U.S. Appl. No. 12/780,236, mailed Jul. 23, 2013.
Notice of Allowance on U.S. Appl. No. 12/780,236, mailed May 13, 2014.
Final Office Action on U.S. Appl. No. 12/780,236, mailed Nov. 8, 2013.

* cited by examiner

SYSTEM AND METHOD FOR SHARING DIGITAL MEDIA CONTENT

CROSS REFERENCE TO RELATED APPLICATIONS

The present application is a continuation-in-part application of U.S. application Ser. No. 09/997,477, filed Nov. 20, 2001 entitled "INTERACTIVE, MULTI-USER MEDIA DELIVERY SYSTEM"; a continuation-in-part application of U.S. application Ser. No. 10/034,832, filed Dec. 28, 2001 entitled "METHOD OF ENHANCING MEDIA CONTENT AND A MEDIA ENHANCEMENT SYSTEM"; and a continuation-in-part application of U.S. application Ser. No. 11/400,889, filed Apr. 10, 2006 entitled "METHOD AND SYSTEM FOR SELECTIVELY SUPPLYING MEDIA CONTENT TO A USER AND MEDIA STORAGE DEVICE FOR USE THEREIN"; the contents of all of which are hereby incorporated by reference.

BACKGROUND

1. Field

The present disclosure relates generally to data processing and media playback systems, and more particularly, to a system and method for sharing digital content over a global computer network, e.g., the Internet, via community web sites.

2. Description of the Related Art

There are presently a variety of different technologies available to deliver media selections, such as audio, video, audio/video, etc. to users in an effective and beneficial format. Portable media storage devices for storing digital content are widely used to enjoy audio and/or video program materials such as music, filmed entertainment (e.g., movies and television programs) among others. Examples of such devices include compact disc (CDs) and digital versatile or video discs (DVDs). CDs and DVDs are fabricated in several forms. For example, CDs may be single-sided, dual-sided, high density (HDCD), super audio (SACD), super video (SVCD), readable, writable, and/or recordable, or capable of storing and playing audio files that are compatible with different operating systems (e.g., a hybrid CD). CDs are also able to store and play various file types, such as .mp3 files, .wav files, .au files, .ram files, and .wma files, just to name a few. Similarly, DVDs may be single-sided, dual-sided, high density, high definition, readable, writable, and/or recordable, single layer, or multi-layer. DVDs are also able to store and play various file types and video formats, such as PAL, NTSC and/or MPEG, AVI, WMV, etc. files. Additional types of portable digital storage devices, such as a memory sticks, secure digital cards (SDCs), CompactFlash cards, microdrives, and Universal Media Discs (UMDs) presently exist which can be employed to deliver content to a user. Further, various new types of portable storage devices are being created on a regular basis. Moreover, there is a substantial volume of material available over computerized networks, such as the Internet which may or may not be related to specific media selections.

Numerous web sites now exist on the global computer network, e.g., the Internet, that focus on bringing people together and allowing them to share information and content. Examples of these sites include My Space, You Tube, Friendster, Facebook, among others. Many of the web sites that focus on bringing people together (now commonly called community web sites) allow the users to list and promote their favorite digital content including music, videos and games. However, no system and method exists for allowing a user to automatically link their stored content (DVDs, CDs, etc) directly to these community web sites. Therefore, a need exists for techniques to allow users to automatically list their media content, and also allow automatic placement of the content onto a community web site that the user is actively participating in.

SUMMARY

A system and method for sharing digital content are provided. A system and method of the present disclosure enable a user to automatically list their media content and also enable automatic placement of the content onto a community web site that the user is participating in. The system and method will further enable other users of the community web site to interact in various ways with the content, whether stored at the web site or on a storage device of the user.

In one aspect of the present disclosure, a method for sharing digital content over a network includes reading at least one identifier of at least one media content; determining at least one pre-selected community web site from a database and an identity of a first user of the at least one media content; transmitting the at least one identifier and the identity to the at least one pre-selected community web site; and posting the at least one identifier on a first predetermined page of the at least one community web site, the first predetermined page being associated with the identity of the first user. The at least one identifier of the at least one media content is a name, an image, at least one frame of a video clip or an audio clip.

In a further aspect, the method further includes determining a second predetermined page of the at least one community web site associated with the at least one identifier of the media content and posting the identity of the first user on the second predetermined page. The second predetermined page is associated with an originator creator of the at least one media content. The originator may include a retailer, reseller, publisher or author.

In another aspect, the at least one media content is locked at a processor of the first user, the method further includes unlocking the at least one media content by at least one second user. Optionally, the method further includes obtaining a license to use the at least one media content from an originator of the at least one media content and unlocking the at least one media content with the license.

In another aspect, the method includes determining at least one second user interested in the at least one media content; and notifying the at least one second user that the at least one media content is posted on the first predetermined page of the at least one community web site.

In yet another aspect of the present disclosure, a method for conducting an interactive session over a network includes reading at least one identifier of at least one media content; determining at least one pre-selected community web site from a database and an identity of a first user of the at least one media content; transmitting the at least one identifier and the identity to the at least one pre-selected community web site; determining if an event is scheduled by an originator of the at least one media content based on the identifier; and notifying the first user of the event. The event may include a chat session or a live video event.

In a still further aspect of the present disclosure, a system for sharing digital content includes at least one media player assembly including: a sharing module configured for reading at least one identifier of at least one media content and determining at least one pre-selected community web site from a database and an identity of a first user of the at least one media content; and a communication device configure for transmitting the at least one identifier and the identity to the at least one pre-selected community web site on at least one remote server; and the remote server configured for posting the at least one identifier on a first predetermined page of the at least one community web site, the first predetermined page being associated with the identity of the first user.

In another aspect, a program storage device readable by a machine, tangibly embodying a program of instructions executable by the machine to perform method steps for sharing digital content, the method steps including reading at least one identifier of at least one media content; determining at least one pre-selected community web site from a database and an identity of a first user of the at least one media content; transmitting the at least one identifier and the identity to the at least one pre-selected community web site; and posting the at least one identifier on a first predetermined page of the at least one community web site, the first predetermined page being associated with the identity of the first user.

In a further aspect, a program storage device readable by a machine, tangibly embodying a program of instructions executable by the machine to perform method steps for conducting an interactive session over a network, the method steps including reading at least one identifier of at least one media content; determining if an event is scheduled by an originator of the at least one media content based on the identifier; notifying the first user of the event and conducting a chat session or live video event.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

A system and method for sharing digital content, e.g., audio, video, etc., over a computer network, e.g., the Internet, via a community web site are provided. The system and method of the present disclosure enables a user to obtain and/or load digital content in a media player assembly, e.g., a computer, an enhanced DVD player, etc. The content could be audio and/or video content, such as movies and other audio/video programming, as well as audio only content, such as music, or other types of developed or to be developed content.

The content can be transported into the media player assembly with any current or future digital storage medium including but not limited to optical media such as DVDs or CDs, removable hard disk storage medium, removable memory cards (CompactFlash, MMC, SD, Memory Stick, etc.), etc. Alternatively, the user could use the global computer network or a local network to transport the content from a source to the media player assembly. Additionally, satellite, infrared, radio transmission of any type, or WiFi transmission can be utilized to transport the content into the media player assembly. The user will then use a user interface module (UIM) incorporating a digital playback decoding module (DPDM) to play the digital content. This playback module will allow the user to control the content including but not limited to Start, Stop, Pause, Go to, Zoom, Fast Forward, Reverse, etc. The user interface module (UIM) will also include a sharing module that will read an identifier from the media content, e.g., a title of the content, name of author, etc. The sharing module will access a database on the media player assembly to determine if the user is participating in any community web sites. The media player assembly will then transmit the identifier of the media content to the community web sites listed in the database along with an identity of the user. As is known in the art, a community web site is a web site residing on a remote server or over several servers that allow individual users to create a personalized web page to enhance social interaction with other users. On such a personalized page, the user can list friends, music likes, general social commentary, etc. The community web site will receive the identifier of the media content and the identity of the user and cause the identifier of the media content to be listed on the personalized web page of the user. It is to be appreciated that the identifier of the media content may be a name of the content, an image of a CD or DVD cover, at least one frame of a video clip, an audio clip, etc. Furthermore, the identity of the user may be an e-mail address, a screen name, etc.

Figure 1:
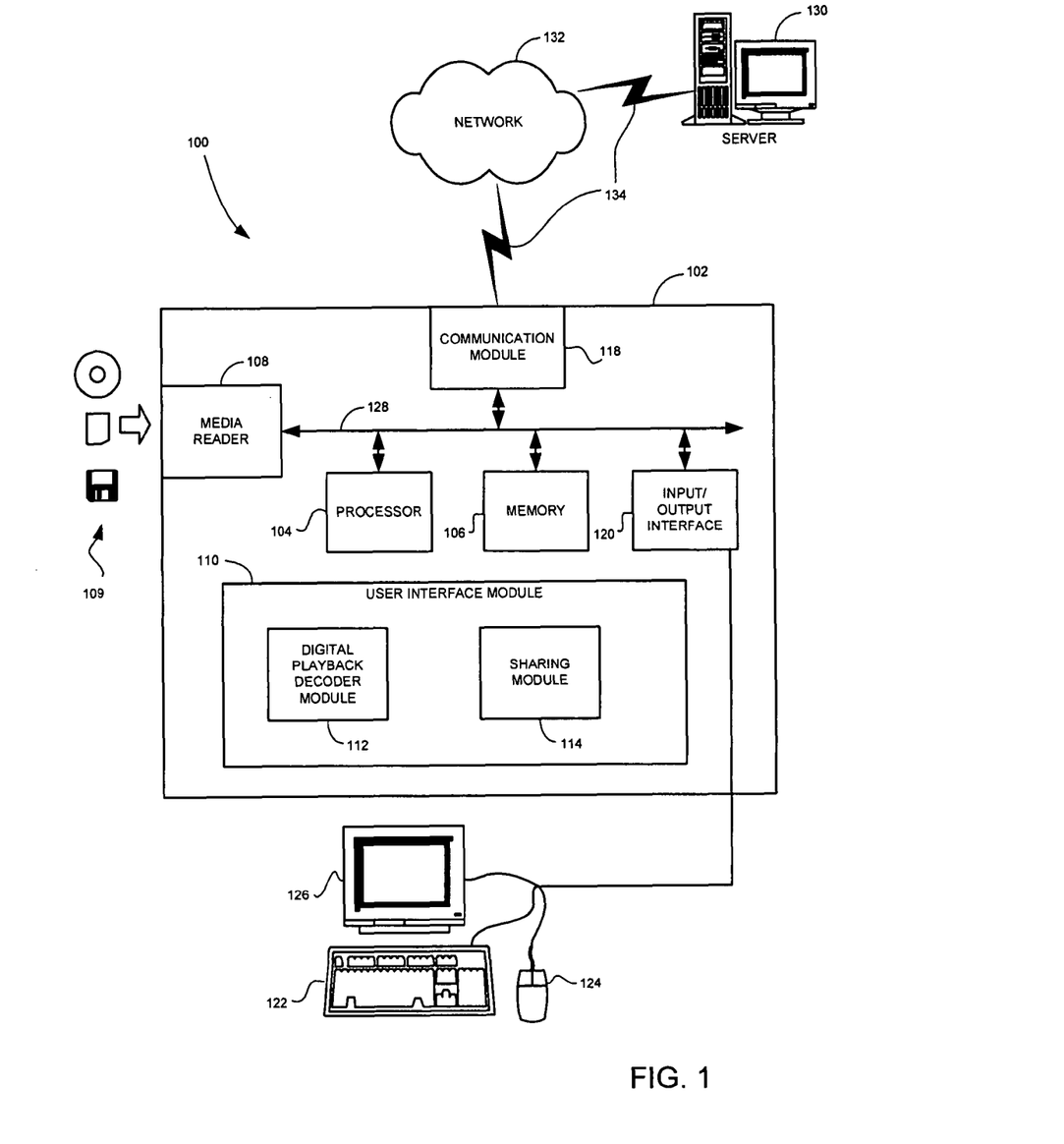
FIG. 1 is a diagram of an exemplary system for sharing digital content in accordance with an embodiment of the present disclosure.

Referring to FIG. 1, a system 100 for sharing digital content is illustrated. The system includes a media player assembly 102 for playing or delivering content to a user with a computer processor 104. The media player assembly 102 will also contain a digital memory storage device 106 that may be in the form of a removable or fixed hard disk device, or may be in the form of writeable memory, or may be in some other form hereto known or created in the future. The media player assembly 102 will also includes a media reader/writer 108 for reading from and writing to external storage media 109. In one embodiment of the present disclosure, the media reader 108 is a optical reader/writer (OR) that will read and process various optical media including but not limited to DVDs, CDs, CD-ROMs, and other types of optical media that may be currently available or available in the future. The optical reader/writer OR may also be able to write and store digital data. In another embodiment, the media reader 108 is a memory card reader/writer (MCR). The memory card reader (MCR) will read various removable memory including but not limited to CompactFlash, SD (Secure Digital) memory, MultiMediaCard (MMC), Memory Stick, SmartMedia and other memory currently existing or created in the future. The memory card reader (MCR) may also be able to write and store digital data.

The media player assembly 102 contains computer instructional code that is operated by the computer processor 104. This code functions to create a user interface module (UIM) 110 for navigating or playing back the digital content. The user interface module (UIM) also incorporates a digital playback decoder module (DPDM). The digital playback decoder module (DPDM) 112 is standard in the art and will playback any type of digital content currently existing including but not limited to DVR.MS files, AVI files, Mpeg (1,2,3,4 5,etc) files, Tivo MPEG files, Replay files, VOB files, IFO files, AAC (audio) files, MP3 (audio) files, wmv (audio) files, Mpeg (audio) files and any other digital media content file format currently existing or to be created in the future. The digital playback decoder module (DPDM) 112 allows the user to playback digital content and to selectively control the digital content. Different digital playback decoder module (DPDM) control units will have different functionality and this variance in functionality is not critical to the overall disclosure. Normal functionality will include but is not limited to instituting Play, Stop, Pause, Rewind, Fast Forward, Zoom of Video (either in a still mode or in a moving mode), freeze frame, Sound Volume up, Sound Volume Down, Sound Muted, Go to a certain time, Go to Certain Chapter, Go to end, Go to beginning, and overlay text onto the screen or playback engine.

The user interface module (UIM) 110 also includes a sharing module (SM) 114, that will allow the user to share content over the global computer network, e.g., the Internet. The sharing module 114 is configured to read content in the form of either local content stored in the memory 106 or stored on external media disposed in the media reader 108, e.g., an OR or MCR as described above. The sharing module 114 reads an identifier for the media content and maintains a database in memory 106 of all the content owned or acquired by the user. The sharing module 114 also maintains in the database a list of community web sites that the user is participating in. The sharing module 114 will cause an identifier of the content and an identity of the user to be sent to a community web site (i.e., that the user is participating in as determined from the database) residing on a server(s) 130 via communication module 118. As will be explained below, the remote server 130 receiving the information will determine the personalized web page of the user from the user's identity and cause the identifier of the media content to be listed on the personalized page. It is to be appreciated that the shared content may be any currently available content including but not limited to an audio file, video file, multimedia file, application file, web site or web page or any content to be developed in the future.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by a machine, e.g., media player assembly 102, comprising any suitable architecture such as a personal computer, a workstation or server. Preferably, the media player assembly 102 is implemented on a computer platform having hardware such as one or more central processing units (CPU), a random access memory (RAM), a read only memory (ROM) and input/output (I/O) interface(s) 120 such as a keyboard 122, cursor control device 124 (e.g., a mouse or joystick) and display device 126, e.g., a monitor. A system bus 128 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the machine by various interfaces and bus structures, such a parallel port, serial port or universal serial bus (USB). One such peripheral device may include a communication module 118, e.g., a modem, satellite relay, wireless connection, etc., for enabling communications from the media player assembly 102 to various servers. Other peripheral devices may include additional storage devices, a printer and a scanner.

It is to be appreciated that although media player assembly 102 is shown as a desktop computer, the media player assembly 102 may include but is not limited to a laptop computer, notebook computer, personal digital assistant (PDA), game console system, cellular or other mobile phone terminal, portable or handheld gaming system, a TV set top box, a high definition receiver, or a media player, e.g., a CD player, a DVD player, or an MP3 player. In these embodiments, the media player assembly may include one or more user input devices, such as a mouse, keyboard, a touchpad, a touchscreen or a microphone (e.g., where a processor of the media player assembly executes voice recognition software and is capable of responding to voice instructions), one or more video display devices, such as a monitor, a plasma or liquid crystal display, or a television and/or one or more standalone or embedded audio output devices, such as speakers.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The media player assembly 102 may operate in a networked environment using logical connections to one or more remote computers, e.g., server 130. The remote computer may be a personal computer, a server, a router, a network PC, a peer device or other common network node, and typically includes many or all of the elements described above relative to the machine. It is to be appreciated that the network 132 may be a local area network (LAN), wide area network (WAN), the Internet or any known network that couples a plurality of computers to enable various modes of communication via network messages. The media player assembly 102 may communicate to the server 130 and network 132 via any known communication link 134, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

Figure 2:
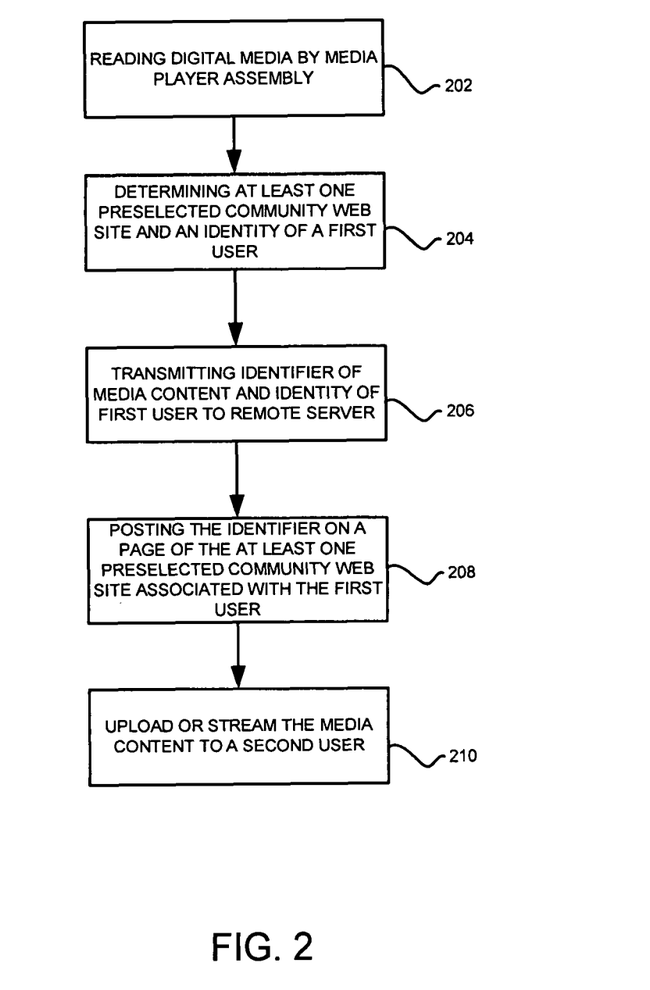
FIG. 2 is a flow chart illustrating a method for sharing digital content in accordance with an embodiment of the present disclosure.

With reference to FIGS. 1 and 2, a system and method of the present disclosure will now be described, where FIG. 2 is a flow chart illustrating a method for sharing digital media content.

Initially, in step 202, digital content is loaded in the media player assembly 102 and the digital content is read by the media player assembly 102. In one embodiment of the disclosure, a user will insert digital content into the media reader 108. The user will then call up the user interface module (UIM) 110 which is powered by the processor 104 contained within the media player assembly 102. The user interface module (UIM) 110 will generate a user interface to control the decoder module (DPDM) 112 which will decode the content. The sharing module 114 will read an identifier of the digital content. In one embodiment, the identifier is the title of the content. In other embodiments, the identifier may be an image, an image of a CD or DVD cover in the case of music or video, a frame of a video clip, etc. Optionally, the sharing module 114 also reads a local or remote database of other media that the user has previously purchased.

The database also contains information (including URL addresses) on the community web sites (e.g. My Space, Friendster, YouTube, Linkln, etc) that the user is participating in along with the specific address for the user at these sites (e.g. http://www.mvspace.com/leighmr where http://www.myspace.com is the URL and/leighmr is the specific page related to the user) and the sub address of where content (music, film, etc) is listed, i.e., a portion of the user's page where the content is to be posted or listed. The sharing module 114 determines which community web sites the user is participating in along with an identity of the user (step 204). It is to be appreciated the user identity may be the same for all web sites, e.g., a common e-mail address, or may be different for each web site, e.g., a screen or login name.

The local processor then connects through the global computer network to these selected community web site(s) and transmits the identifier of the media content and the identity of the user to the selected web sites (206). In step 208, the remote server(s) hosting the community web sites will receive this information and automatically post the name of the stored content on the selected site (at the place/address that the user has designated on the site for this information). Optionally, the remote server will place a stored image of the content (stored on the user's digital media) and optionally additional content (which may include a video trailer segment, artwork or ancillary content, etc also stored with the user's digital content) at the web site. This content could be uploaded to the remote community web site, or optionally streamed directly from the user's local processor and media reader so other users of the community web site can now access and share the media content (step 210).

Figure 3:
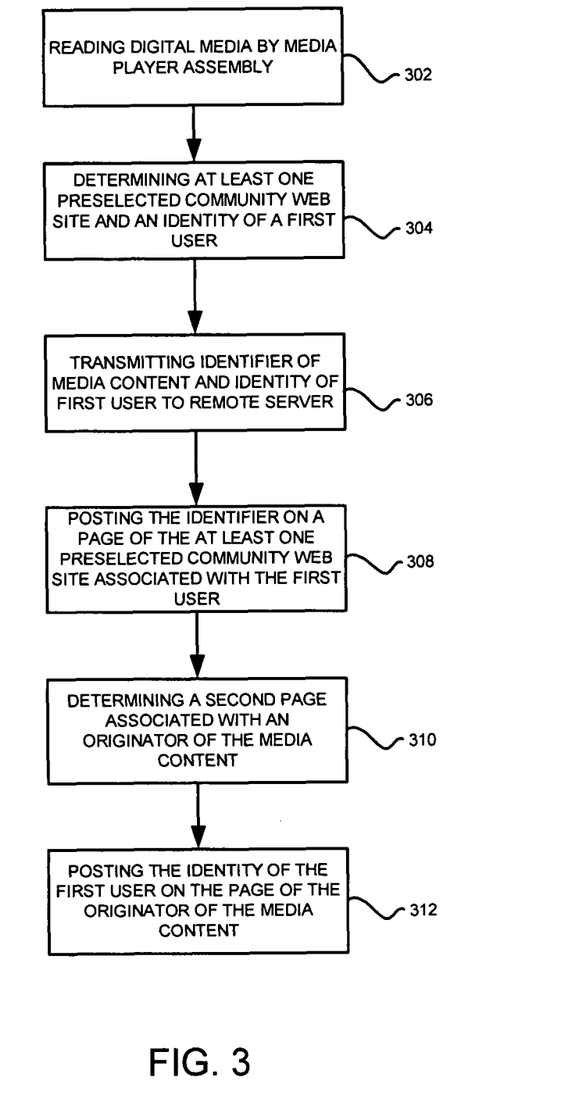
FIG. 3 is a flow chart illustrating a method for networking with users of a community web site in accordance with another embodiment of the present disclosure.

In another embodiment, the system and method of the present disclosure will automatically place an identity of a user on a predetermined page associated with the media content, e.g., a profile page for the media content. By example, in the case of the My Space community web site, a section exists for each user profile called friends. This section contains the friends who elect to be listed as a 'friend' of the subject profile. Many profiles exist of digital media titles such as movies or recording artists, and these profiles contain lists of many of the movie or recording artists 'friends'. Referring to FIG. 3, in steps 302-308, the media content is placed into the local processor, the media title or identifier is read and then transmitted along with any other information or content on the local user (which would have been entered the first time the user places digital media in his/her local processor to be read by the subject program) and the identifier of the media content is posted at a page of the user, as describe above. In step 310, a second page of the community web site is determined based on the identifier of the media content, e.g., a page for a particular CD or a page for a particular artist. Once the remote server determined the page associated with the media content, the remote server 130 will post the identity of the user on the second page, i.e., the page of the media content (step 312). For example, if a user places a Bon Jovi CD in his/her local media player assembly, then automatically the user would be listed as a 'friend' of Bon Jovi at the applicable community web site, e.g., My Space.

In another embodiment of the present disclosure, the content provider or originator (such as a retailer, reseller, publisher or author) may provide content on the stored medium that the user can broadcast one time or many times at the designated community web site. This content may be encrypted and then unlocked by another user on the web site or by the content publisher from a remote web site. This interaction between stored content and the remote server is described in commonly owned U.S. Pat. No. 6,101,534 entitled "Interactive, Remote, Computer Interface System", the contents of which are incorporated by reference. By example, a user could place a DVD into his/her local processor and then at a designated time the publisher of the content could unlock content from that DVD, and stream or download that content to the remote server for viewing by a user or users on the community web site. An application of this would be for multiple community users to explore stored content located at a single community user's local processor, for various hidden and bonus features. The media content may be globally unlocked via the remote server of the publisher or originator or, in other applications, the remote server could selectively unlock the media. In a particular embodiment, this unlocking of content could be part of an e-commerce transaction to purchase the unlock mechanism. For example, a remote or second user may be required to obtain a license for the media content and then use the license to unlock the media content. Of course, if the remote server/publisher wants a wide audience for the content, it would/should allow a universal unlock of this content. In further embodiments, this unlock can be time determined, with the unlocking not occurring until the publisher determines it is time to peform the unlocking of the content. By example, for a movie trailer, the unlocking of the content may not occur until the announcement commencement date of the movie.

In another application of the present disclosure, the user would select his/her digital media at the local processor (e.g. DVD, CD or stored video file such as wmv, avi, mpeg, quicktime etc.) and then a dialogue box would ask the user if he wanted to share this video or other content with another user or users at the selected community web site (e.g. My Space, Friendster, You Tube, etc). If the local user elects to share the digital media then a notification of the user's intent to share would be transmitted through the global computer network to the remote server (i.e., the community web site). Users at the remote community would view this notice and decide whether they wanted to share the digital media with the user at the local processor. The announcement or notification could be to a prestored list of 'friends' stored at either the local processor or the remote server by the user. Or the selection could be made by demographically or psychograpically profiling the overall users in the community. Such profiling could include opt-in or opt-out status where the user determines along certain lines whether he/she wants to be in certain selections or out of them and so notifies the community. If they elect to share depending on the digital rights assigned to the digital media, the digital media could either be shared from the local processor storage assembly to the remote server and the remote user and the local user and the users on the remote side would be able to watch or listen to the media using standard media players (Windows™ Media Player, Quicktime, Real Player, etc). The digital media in this example may have been uploaded and shared or streamed from the local processor storage assembly to the remote server.

In the case where the digital rights assigned to the media that the user wishes to share will not allow sharing, then the remote user will be prompted to locate the same digital media (again a DVD, a CD, a wmv, quicktime, mpeg, etc) file and allow his/her remote processor access to this file. The remote server utilizes a database of users who are currently accessing or who have accessed the identical digital media. This information would be compiled and maintained at the remote server (e.g., in a database) and this information would be used by the remote server to determine who in the community has the same digital media as the subject user at the local processor. These other users or user would then be notified by the remote server to facilitate participation. The remote processor or the local processor or the community server may also authenticate this digital media. Once the media is located and optionally authenticated, then the local user's media and the remote user's media would be synced for a shared listening or viewing experience. A method and system for providing simultaneous viewing of content to a plurality of users over a network is described in commonly owned U.S. application Ser. No. 09/997,447, the contents of which are hereby incorporated by reference.

Figure 4:
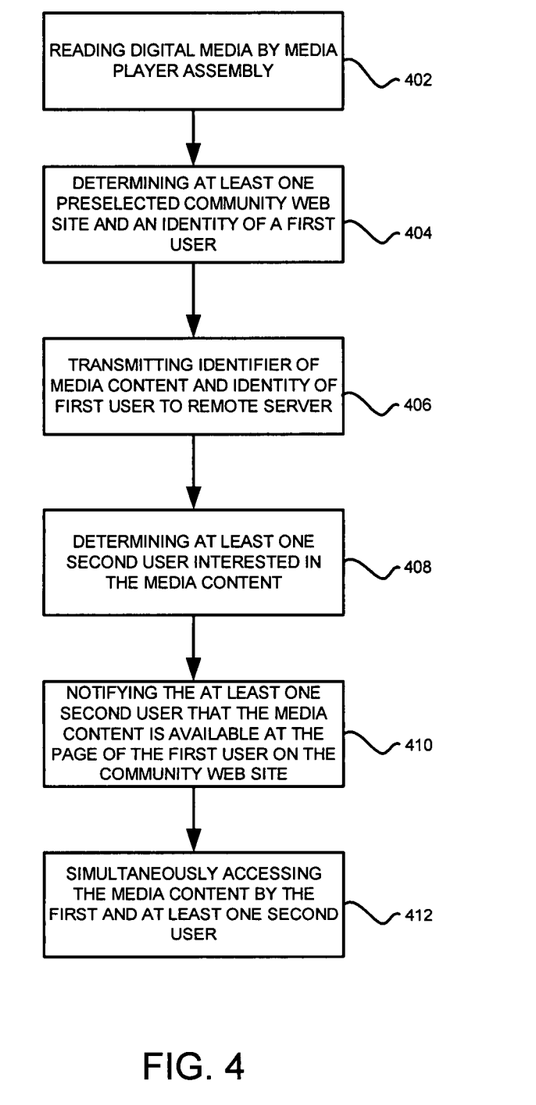
FIG. 4 is a flow chart illustrating a method for sharing digital content in accordance with another embodiment of the present disclosure.

Referring to FIG. 4, in another embodiment of the present disclosure, after the user places the digital content in his/her local processor/media reader, and the processor reads the identifier, e.g., title, of the content (step 402) and the URL address of the community web site(s) that the user wishes to interact with (step 404), the processor would also read a list of the users at the web site that the local user believes would be interested in the content, for example, other users, i.e., friends, listed on the user's personalized page. Alternatively, the local processor could contact the remote processor at the community web site, and give the remote web site the name of the local content, and any other pertinent information, (step 406) and then the remote web site would use database query software to determine remote users who would have interest in the local user's content (step 408). This query may be based on demographic or psychographic profiling of the users of the community web site. In either event once the local processor has information on who (in the community) may be interested in the local content, then either the local processor or the remote processor will communicate with those users through e-mail, or instant messaging, or any other interactive communicating technique, to notify those users that they may share the local user's content (step 410). This sharing of content may include the simultaneous listening (in the case of music) or viewing of the content (in the case of video) either through uploading/downloading the content, or streaming the content (step 412), all of which is discussed in detail in U.S. application Ser. No. 09/997,447.

Figure 5:
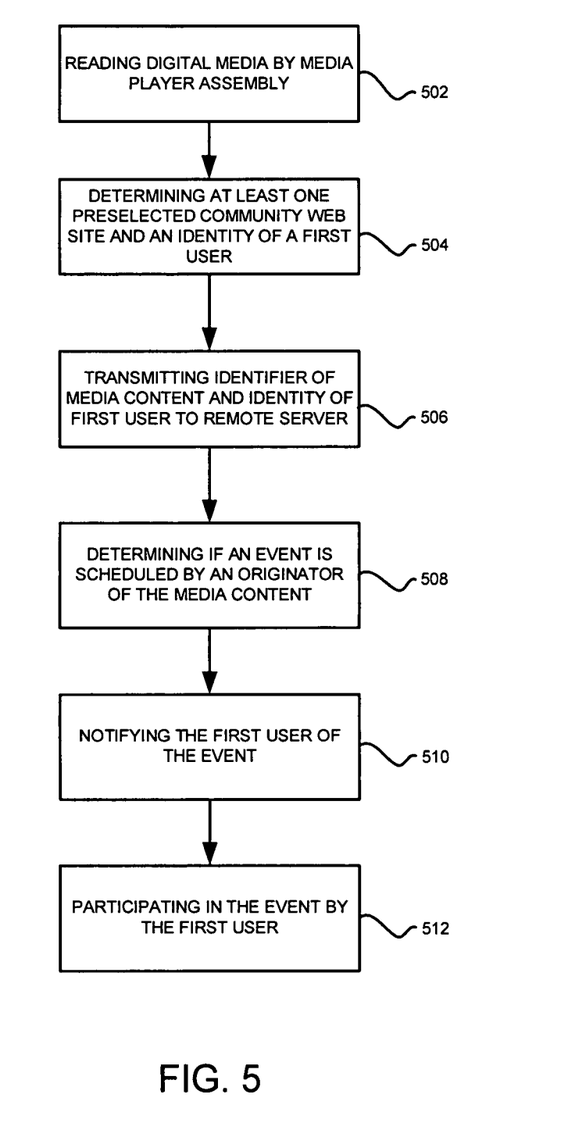
FIG. 5 is a flow chart illustrating a method for conducting an interactive session over a network in accordance with a further embodiment of the present disclosure.

Referring to FIG. 5, a further embodiment of the present disclosure is illustrated where a user can participate in a live multi-party event. In step 502, the user would access digital content with his/her local processor (e.g., CD, DVD, UMD, etc,) and the local processor would read the name or identifier of the digital media content. Optionally, in step 504, the local processor of the media player assembly determines a community web site the user is participating in along with the user's identity. In step 506, the remote server is informed of the local media and the remote server/processor searches to see if there are any relevant events for the subject media (step 508). In step 510, the user is then notified of the event, and if the user wishes (using local software installed such as web conferencing, or multiple video/audio chat) the user commences a multi-party experience (step 512). Alternatively, the remote server will download computer software code to the local user's media player assembly that would allow the user to participate in a live video event with affiliated parties from the digital media. By example, if the user purchased a Seinfeld television program DVD the user would, upon accessing this DVD, be provided computer software code that would install on his/her local computer. The local processor would then use this software program to contact a remote server and determine which affiliated party to the digital media (in this example Michael Richards, an actor from the Seinfeld television program) would be available for a live event with the local user. This event could be a chat session, or a simultaneous viewing of content from the Seinfeld television program, or any other type of special event. If the local user wishes to participate the software provided by the local digital media would allow him to participate in this live event.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method comprising:
receiving, at a remote server, an identifier of media content from a media player of a first user;
receiving, at the remote server, an identity of the first user of the media content;
posting the identifier of the media content on a first page of a community web site, wherein the first page is associated with the first user;
identifying a second page of the community web site associated with an originator that created the media content, wherein the first user is not the originator, and wherein the second page is identified based on the identifier of the media content that is received from the media player of the first user;
establishing a connection between the first user and the originator; and
displaying the established connection by posting the identity of the first user on the second page.

2. The method of claim 1, wherein the identifier of the media content comprises a name, an image, at least one frame of a video clip, or at least one frame of an audio clip.

3. The method of claim 1, wherein the originator comprises an artist, a retailer, a reseller, a publisher, or an author.

4. The method of claim 1, further comprising uploading the media content to the community web site.

5. The method of claim 4, wherein the uploaded media content is accessible by a second user.

6. The method of claim 1, further comprising receiving a stream of the media content from a device of the first user.

7. The method of claim 6, further comprising posting the received media content to the community web site such that the media content is accessible by a second user.

8. The method of claim 1, wherein the media content originates from removable media of the first user.

9. The method of claim 1, further comprising:
identifying a second user that is interested in the media content; and
notifying the second user that the media content is posted on the first page of the community web site.

10. The method of claim 9, wherein the notifying comprises e-mailing the second user or instant messaging the second user.

11. The method of claim 9, wherein the identifying is based on demographic or psychographic profiling of the second user.

12. A system comprising:
- a memory configured to store identifier of media content and an identity of a first user of the media content, wherein at least the identifier is received from a media player of the first user; and
- a processor operatively coupled to the memory and configured to:
    - post the identifier on a first page of a community web site, wherein the first page is associated with the first user;
    - identify a second page of the community web site associated with an originator that created the media content, wherein the first user is not the originator, and wherein the second page is identified based on the identifier of the media content that is received from the media player of the first user;
    - establish a connection between the first user and the originator; and
    - display the established connection by posting the identity of the first user on the second page.

13. The system of claim 12, wherein the identifier of the media content comprises a name, an image, at least one frame of a video clip, or at least one frame of an audio clip.

14. The system of claim 12, wherein the originator comprises an artist, a retailer, a reseller, a publisher, or an author.

15. The system of claim 12, wherein the processor is further configured to upload the media content to the community web site.

16. The system of claim 12, wherein the processor further configured to receive a stream of the media content from the media player.

17. A tangible computer-readable medium having instructions stored thereon, the instructions comprising:
- instructions to receive an identifier of media content from a media player-of a first user;
- instructions to receive an identity of the first user;
- instructions to post the identifier on a first page of a community web site, wherein the first page is associated with the first user;
- instructions to identify a second page of the community web site associated with an originator that created the media content, wherein the first user is not the originator, and wherein the second page is identified based at least on the identifier of the media content that is received from the media player of the first user;
- instructions to establish a connection between the first user and the originator; and
- instructions to display the established connection by posting the identity of the first user on the second page.

18. The method of claim 1, further comprising receiving an identification of the community web site from the media player, wherein the identification originates from a database associated with the media player.

* * * * *